United States Patent Office 2,924,583
Patented Feb. 9, 1960

2,924,583
VINYL CHLORIDE RESIN COMPOSITIONS, STABILIZED AND PLASTICIZED WITH EPOXY COMPOUNDS

Paul S. Starcher, Charleston, Samuel W. Tinsley, South Charleston, and Dennis H. Mullins, St. Albans, W. Va., assignors to Union Carbide Corporation, a corporation of New York No Drawing. Application December 31, 1957
Serial No. 706,309

4 Claims. (Cl. 260—30.4)

This invention relates to plasticized and heat and light stabilized polymer compositions and has for an object the provision of improved polymer compositions in which the heat and light stabilizers also act as plasticizers and thus serve as combination plasticizers and stabilizers. More particularly, this invention is directed to plasticized vinyl halide polymers and to heat and light stabilized vinyl halide polymers.

Like many other resins and resin-like materials, the vinyl halide resins form the basis of various plastic compositions in which they are associated with other substances which modify their properties in some desirable manner. For example, the vinyl resins may be compounded with various softening substances of low volatility which act as plasticizers to form softened compositions of increased resilience and flexibility. In common with most related compositions, the plasticized vinyl halide resins generally become increasingly softer and the heat softening temperature of the compositions is reduced as the amount of plasticizers in the composition is increased. Also, it is quite usual for these softened compositions to exhibit an increased tendency toward tackiness as the quantity of plasticizer is increased, and this quality is almost invariably present when the plasticized compositions are additionally softened by heat. The effect of plasticizers on the physical properties of finished plastic products containing the same is indeed an important part of the success of plastic products in industry today.

With the increasing demand for plastic products and plastic-containing products in a wide variety of industrial applications, many changes have been made by the plastics manufacturer to keep pace with the demand for new and useful plastic products.

High-speed, high-temperature processing of vinyl halide resin compositions, and their increasing use in outdoor applications, such as garden hose, automotive upholstery, automobile convertible tops, agricultural irrigation accessories, agricultural goods and implements and the lkie have placed increasing demands for better plasticizers and stabilizers for use in vinyl halide resin compositions to alleviate certain shortcomings inherent in these resins. One of the most serious problems is the deteriorating effects of heat and light upon vinyl halide resin compositions. These deleterious effects are manifested by discoloration and loss of mechanical strength of the resin composition.

In the case of plasticized vinyl halide resins, the problem may be further aggravated by instability on the part of the plasticizer and this condition may result in unsightly and troublesome exudation that has an adverse effect on the physical properties and appearance of the composition. Exudation of the plasticizer is very often the result of alterations in the chemical structure of the plasticizer, through attack by the degradation products of the resin, or by the action of sunlight or the combined action of both. Thus, not only is there a need for adequate stabilization of the resin against the effects of heat and light, but the plasticizer as well may require some protection.

On the other hand, a compound that exhibits good heat-stabilizing ability with vinyl halide resins may be relatively ineffective as a light stabilizer. For certain applications, particularly those utilizing plasticized, transparent, vinyl halide compositions, a highly desirable stabilizer would be one that possesses ability to plasticize as well as stabilize against both heat and light. Some progress, in this direction, has been made in recent years with the discovery that certain epoxidized natural oils are attractive plasticizer-stabilizer combinations for polyvinyl chloride and some vinyl chloride-containing copolymers but, however, it has been shown that resin compositions utilizing epoxidized natural oils are limited in their uses since these oils are not entirely compatible with vinyl chloride polymers and destruction of epoxidized natural oil by the degradation products of the resin causes exudation from the resin composition.

It is a principal object, therefore, to provide resin compositions which are markedly superior to resin compositions containing epoxidized natural oils.

It has been discovered that this and other objects of the invention can be readily accomplished by intimately associating with vinyl halide compositions an amount of certain epoxides of 3-cyclohexene-1,1-dimethanol esters of acids and mixtures of acids comprising linoleic and/or linolenic acids. In general, the aforesaid epoxides can be conveniently characterized according to the general formula:

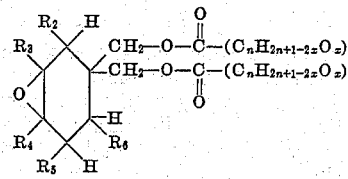

wherein $R_2$ through $R_6$ represent hydrogen atoms or lower alkyl groups and each of the groups

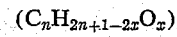
$(C_nH_{2n+1-2x}O_x)$ separately represent an epoxyalkyl group containing $n$ carbon atoms, $2n+1-2x$ hydrogen atoms and $x$ oxygen atoms and wherein $n$ represents the integer 17 and $x$ represents a whole positive integer in the range of from 2 thorugh 3.

Thus, an important embodiment of this invention is directed to compositions comprising a vinyl halide resin containing mixtures comprising the dihydroxy diesters of alcohols selected from the group consisting of 3,4-epoxycyclohexane-1,1-dimethanol and lower alkyl substituted 3,4-epoxycyclohexane-1,1-dimethanols in which the hydroxyl groups of said alcohols are esterified by non-conjugated epoxy acids characterized by the formula:

$(C_nH_{2n+1-2x}O_x)COOH$ wherein the group $(C_nH_{2n+1-2x}O_x)$ represents an epoxyalkyl group containing $n$ carbon atoms, $2n+1-2x$ hydrogen atoms and $x$ oxygen atoms and wherein $n$ represents the integer 17 and $x$ represents a whole positive integer in the range of from 2 through 3.

Another novel feature and particularly important embodiment of this invention is directed to compositions comprising vinyl halide resin containing the partially epoxidized mixtures of the dihydroxy diesters of the above-mentioned alcohols and acids containing at least 2.4 weight percent oxirane oxygen and preferably from 2.4 to about 8.5 weight percent oxirane oxygen.

It has been discovered that not only are the epoxides, herein disclosed, useful as plasticizers for vinyl halide resins but are also useful as heat and light stabilizers as well.

The plasticizers and stabilizers employed in the compositions of this invention are prepared by the reaction of peracetic acid or acetaldehyde monoperacetate and a trienoic acid ester of 3-cyclohexene-1,1-dimethanol as illustrated by the following general equation, in the case of 3-cyclohexene-1,1-dimethanol dilinolenate.

ample, methyl, ethyl, propyl, isopropyl, butyl, isobutyl, tertiary butyl groups, and the like.

Particularly preferred 3-cyclohexene-1,1-dimethanols to be used in producing the novel epoxy esters of this invention are 3-cyclohexene-1,1-dimethanol and the methyl substituted 3-cyclohexene-1,1-dimethanols which include representative compounds such as 6-methyl-3-cyclohexene-1,1-dimethanol.

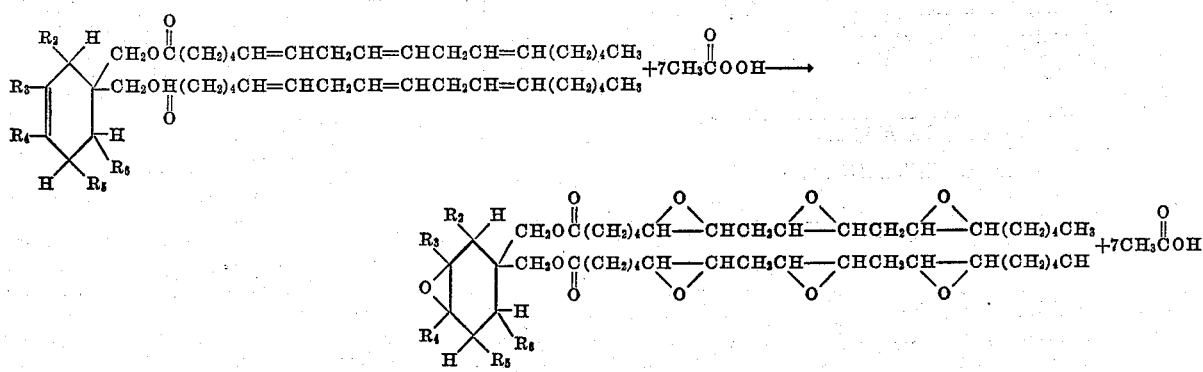

The process of producing the plasticizers and stabilizers is carried out at temperatures in the range of from −25° C. to 150° C. At lower temperatures, the rate of epoxidation is slow. At higher temperatures, the rate of epoxidation is faster, but precautions are necessary to prevent the further reaction of the epoxide groups. Temperatures in the range of from 10° C. to 90° C. are preferably used to provide a suitable reaction rate and to avoid undesired side reactions. The olefinically unsaturated starting material is conveniently charged to a reaction vessel and the theoretical quantity of peracetic acid is then added. Seven or more mols of peracetic acid per mol of olefinically unsaturated compound are usually added to the olefinically unsaturated starting material. Both types of double bonds in the molecule are relatively easily attacked by the peracetic acid and the epoxidation of both types appears to proceed simultaneously. The reaction is allowed to proceed until approximately the theoretical amount of peracetic acid is consumed, which is determined by periodic tests for peracetic acid. The time of reaction is usually from about one to ten hours, depending on the temperature. In working up the crude reaction product, it is preferred, although not absolutely necessary, to separate the by-product acetic acid from the epoxide rapidly, since the by-product acetic acid will react with the epoxide to form undesired products thus decreasing the overall yield of triepoxide product. The reaction mixture is then subjected to conventional recovery procedures for the recovery of the epoxide product. The product can be recovered by extraction with a suitable solvent; continuous distillation or distillation under reduced pressures as desired, or a residue product may be taken.

The 3-cyclohexene-1,1-dimethanols are obtained by the reaction of the corresponding 3-cyclohexenecarboxaldehyde (prepared by the Diels-Alder reaction of butadiene or a substituted butadiene with acrolein, crotonaldehyde, and the like) with excess formaldehyde in the presence of a base catalyst such as KOH as described by H. E. French and D. M. Gallagher in J.A.C.S., 64, 1497 (1942). A variety of cycloaliphatic aldehydes suitable for reaction with formaldehyde to form the corresponding 3-cyclohexene-1,1-dimethanols can be produced having alkyl substituents contained in the ring when compounds such as acrolein and crotonaldehyde are reacted with dienes such as butadiene, piperylene, isoprene, 2,3-dimethyl-1,3-pentadiene and the like.

The preferred 3-cyclohexene-1,1-dimethanols which contain alkyl groups attached to the cyclohexenyl ring are those with alkyl substituents having from one to four carbon atoms in the alkyl chain such as, for ex- The fatty acids can be derived from any animal, vegetable or marine oil containing linolenic acid. The fatty acid group can be the mixed fatty acids in such oils. Typical oils which can be employed include cottonseed oil, linseed oil, perilla oil, rapeseed oil, safflower oil, and soybean oil. If desired the linolenic or linoleic acids can be isolated in the pure state although that is not necessary. In fact it is sometimes desirable to employ the mixed fatty acids directly because of ease of handling and cost.

The fatty acid or mixture of fatty acids are esterified in a conventional manner with an appropriate 3-cyclohexene-1,1-dimethanol to provide the starting material for epoxidation as aforesaid.

The degree of protection that these novel plasticizer and stabilizer epoxides confer upon vinyl halide resin compositions is related to the concentration of the epoxy compound in the resin composition. It has been discovered that as little as 0.5 percent by weight based on the resin of the epoxide will confer desirable, beneficial effects upon the vinyl halide resin composition.

It has also been discovered that the epoxides can be used alone or in conjunction with other plasticizers. When it is desired to use the epoxide as a plasticizer, it has been discovered that the amount of epoxide is not narrowly critical. As little as 0.1 part by weight (0.1 percent by weight) of epoxide per hundred parts of resin will impart a noticeable difference in the desired degree of flexibility and confer some protection against embrittlement at low temperature and the degradative effects of exposure to heat and light. However, the majority of plasticized vinyl chloride resin compositions are based on mixtures of plasticizers in order to obtain the desired properties in the finished items and it has been found that the epoxides disclosed herein can be used effectively in conjunction with conventional plasticizers. The presence of these epoxides adds measurably to the heat and light stability of the vinyl halide resin composition in addition to contributing towards the flexibilizing of these compositions.

Where stabilization of a vinyl halide composition is the primary objective, with little or no interference with other properties, concentrations of epoxides in the range of from 1.5 to 8 parts by weight per hundred parts of resin have been found to be adequate. In specific applications requiring freedom from color drift during processing, such as in transparent films, it is sometimes necessary to use auxiliary cadmium-containing stabilizers in conjunction with the epoxides. Also, it has been found that synergism is exhibited when cadmium-barium compounds are used in conjunction with the epoxides in resin compositions.

The vinyl halide resins which can be satisfactorily plasticized and stabilized by the epoxides herein disclosed can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers. Preferred vinyl halide resins are the polyvinyl chloride resins and resins containing a major amount of copolymerized vinyl chloride.

The plasticizer-stabilizers of this invention may be employed alone or with other plasticizers in vinyl chloride compositions to obtain the desired results. It is particularly advantageous to employ these plasticizers and stabilizers in conjunction with other commercial plasticizers and the like since it permits the obtainment of highly desirable efficiency through the joint use of a relatively small amount of a highly efficient, more expensive epoxide compound as stabilizer and a relatively large amount of a less efficient, less expensive commercial plasticizer without sacrificing the desired effects. As noted hereinbefore, the incorporation of epoxides, disclosed herein, into vinyl halide compositions, in conjunction with cadmium and cadmium-barium compounds produces a synergistic stabilizing effect. In other words, the stabilizing effect produced by the use of two different substances in combination is considerably greater than the sum of the stabilizing effects expected from use of either substance alone.

In preparing specimens for evaluation of the compositions for flexibility, resistance to embrittlement at lower temperatures and resistance to the deteriorative effects of heat and light, a basic recipe comprising a vinyl halide resin is mechanically mixed with various amounts of the epoxy compounds, defined by the general formula set forth above, with or without a supplementary plasticizer such as dioctyl phthalate and the resulting mixtures fluxed and milled on a heated, laboratory, differential speed two-roll mill. The surface temperature of the rolls is maintained at 158° C. generally but higher temperatures, in the neighborhood of 170° C. can be employed.

The heat-stabilizing ability of the epoxy compounds is determined by both static and dynamic methods. When the heat-stabilizing ability is to be determined by the static method, samples of the fluxed sheet are mounted on a stainless steel wire mesh screen and placed in a circulating air oven wherein the temperature is maintained at about 158° C. Samples are then withdrawn at approximately thirty-minute intervals and discoloration, with respect to the original sheet, is determined by means of a Photovolt Reflection Meter, Model 610, equipped with a Wratten C–5 blue filter. The color is reported as percent blue-light reflectance (percent BLR) as determined with the transparent sheet mounted on a block of magnesium carbonate which reflects 100 percent of the incident beam of blue light.

The dynamic heat-stability test is conducted in a manner similar to the static heat-stability test except that milling of the sheet is continued, with periodic sampling for color measurements, until severe discoloration is induced.

The compositions can be tested for light stability by preparing specimens, as set forth above, and exposing them outdoors. Typical samples were prepared and sent to Florida. The specimens were mounted, with no supporting back, at a forty-five degree angle from the horizontal facing south. The exposure time is recorded in sun-hours, a sun-hour being a cumulative period of sixty minutes during which radiant energy amounts to as much as 0.823 gram-calories per square centimeter per minute. Clippings from the exposed samples are examined, after so many sun-hours, to determine whether shortcomings such as discoloration, spotting, stiffening or exudation had been induced by exposure to sunlight. An excessive degree of any one or a combination of these shortcomings constitutes failure.

In determining the plasticizing ability of the various epoxy compounds, amounts of the epoxide are incorporated into the vinyl chloride resin composition which would impart an arbitrary flexibility to the vinyl chloride resin composition. In this case, the selected flexibility was a modulus of 1000 pounds per square inch at 100 percent elongation as read from a stress-strain curve determined at 24.5° C. on a Scott L–6 tensile tester operating at a constant rate of elongation of four feet per minute. The amount of the epoxide required to impart the desired degree of flexibility is listed as the effectiveness in parts per 100 parts of resin. Mixtures of vinyl chloride resin composition and epoxy compound are fluxed for five minutes at 158° C., and samples from the resulting milled sheet were then compression molded for ten minutes at 158° C. to form suitable samples for testing.

In reporting the results of the evaluation of the composition certain symbols and abbreviations have been employed for the sake of simplicity and brevity. Accordingly, the following test methods, symbols, and abbreviations, as used in the examples, are defined as follows:

(a) ASTM=American Society of Testing Materials.
(b) $T_F$ and $T_4$=points corresponding to 135,000 and 10,000 pounds per square inch respectively on a stiffness-temperature curve obtained in accordance with the procedure set forth in the manual of ASTM D1043–51.
(c) Brittle temperature ($T_B$)=the temperature obtained by means of low temperature impact test according to the procedure set forth in the manual of ASTM D746–52T.
(d) SPI volatility loss=value obtained in accordance with the procedure in the manual of ASTM D1203–52T.
(e) Durometer "A" hardness=an indentation measurement of hardness obtained with the Shore Durometer, "A" head.
(f) Sweat out=visual and manual examinations to detect any exudation of plasticizer that may appear as beads, a smear or a blush on the surface of the plasticized material. The observation is made after two weeks of aging at 25° C.
(g) Instron stiffness modulus=one hundred times the stress required to elongate a sample one percent as measured on an Instron Tensile Tester at room temperature (24° C.).
(h) Accelerated oil and water extraction:
  Oil=Films 4-mils thick and mounted between beds of glass beads and covered with preheated mineral oil. The test is run at 50° C. for a time sufficient to obtain between 3 and 10 percent weight loss. Oil extraction constant $k$ is calculated from:

$$k = \frac{W_1 - W_2}{a\sqrt{t}}$$

$W_1$=original weight (g.)
  $W_2$=final weight (g.)
  $a$=total area (square meters)
  $t$=time (hours)
  Water=Films 4-mils thick are mounted between beds of water-washed activated carbon and covered with distilled water. The test is run at 70° C. for 24 hours. Percent weight loss of the films at the end of the test period is recorded.

The following examples will serve to illustrate the practice of the invention.

EXAMPLE 1

*Preparation of linseed oil acid diesters of 3-cyclohexene-1,1-dimethanol*

A mixture of 71 grams of 3-cyclohexene-1,1-dimethanol, 311 grams of linseed oil fatty acids (a product of the Wobum Degreasing Co. designated "Linseedine Fatty Acids"), 300 ml. of toluene, and 0.4 gram tetrabutyl titanate was charged to a still kettle equipped with a fractionating column containing a stillhead suitable for decanting the water layer of the distillate. The mixture was heated under reflux (kettle temperature 160° C.–201° C.) until water evolution had ceased (13 hours). The residue product was washed with hot water and stripped of volatiles and excess acid to a temperature of 210° C. at 8 mm. pressure. The residue product, the linseed fatty acid ester of 3-cyclohexene-1,1-dimethanol was characterized by the following properties:

| | |
|---|---|
| Color | No. 12 Gardner |
| Acidity | 0.219 |
| Saponification equi | 312.9 |
| Iodine No | 193.5 |
| Density 20/20 | 0.9475 |
| N 30/D | 1.4824 |

EXAMPLE 2

*Preparation of 3,4-epoxycyclohexane-1,1-dimethanol bis-(9, 10, 12, 13, 15, 16-triepoxystearate)*

A solution (298 grams) of 28 percent peracetic acid (1.1 mols) in ethyl acetate is added, with stirring, over a period of 45 minutes at a temperature of 50° C. to 95 grams (0.143 mol) of 3-cyclohexene-1,1-dimethanol dilinolenate. Stirring is continued for an additional 4 hours whereupon analyses for peracetic acid indicated that consumption of peracetic acid had substantially ceased. The reaction mixture is fed dropwise to the kettle of a still containing ethylbenzene under reflux at such a pressure as to maintain a kettle temperature of 50° C. Ethyl acetate, acetic acid, and ethylbenzene are removed continuously. After the addition is complete, the kettle material is stripped of volatiles by keeping it for 2 hours at a temperature of 70° C. under a pressure of 1 mm. while allowing a very slow stream of nitrogen to be admitted below the surface of the liquid. The residue product, predominately 3,4-epoxycyclohexane-1,1-dimethanol bis-(9, 10, 12, 13, 15, 16-triepoxystearate) is characterized as a pale yellow viscous liquid having an oxirane oxygen content of 10.5 percent oxirane oxygen.

EXAMPLE 3

*Preparation of 3,4-epoxycyclohexane-1,1-dimethanol bis-(9, 10, 12, 13-diepoxystearate)*

A solution (363 grams) of 23 percent peracetic acid (1.1 mols) in ethyl acetate is added with stirring, over a period of 1 hour at a temperature of 50° C. to 133 grams (0.2 mol) of 3-cyclohexene-1,1-dimethanol dilinoleate. The reaction is continued at the same temperature for an additional 3.5 hours, whereupon an analysis for peracetic acid indicated that the reaction had proceeded substantially to completion. The reaction mixture is fed dropwise to the kettle of a still containing ethylbenzene under reflux at such a pressure as to maintain a kettle temperature of 50° C. Ethyl acetate, acetic acid, and ethylbenzene are removed continuously. After the addition is complete, the kettle material is stripped of volatiles by heating for 3 hours at 70° C. at 2 mm. pressure in a slow stream of nitrogen.

EXAMPLE 4

*Preparation of epoxidized linseed oil acid diesters of 3-cyclohexene-1,1-dimethanol*

A solution of 2.4 mols of peracetic acid in ethyl acetate is added dropwise to 275 grams of the linseed oil fatty acid ester of 3-cyclohexene-1,1-dimethanol over a period of 1 hour and 55 minutes while the temperature is maintained in the range of from 50 to 55° C. Stirring is continued for an additional 2 hours and 25 minutes whereupon an analysis for peracetic acid indicates that the reaction had proceeded substantially to completion. The reaction mixture is then stored at —11° C. for a period of 16 hours. The residue product is then purified by removing ethyl acetate, acetic acid and other volatiles and there is provided 311 grams of a light amber liquid having an oxirane oxygen content of 8.23 percent, an iodine value of 4.6 and a color of 6 Gardner.

EXAMPLE 5

Recipes were prepared to test the performance of the epoxidized linseed oil fatty acid diester of 3-cyclohexene-1,1-dimethanol having an oxirane oxygen content of 8.23 percent as a heat and light stabilizer for a vinyl halide resin. The recipes comprised 100 parts of a vinyl chloride-vinyl acetate polymer resin containing from 96 to 98 percent vinyl chloride, various amounts of a commercial plasticizer, dioctyl phthalate, and various amounts of the aforementioned epoxide.

The amounts employed in the tests are reflected in Table 1.

All of the recipe compositions were subjected to heat and light stability tests in accordance with the procedures hereinbefore described. The results of the tests are summarized in the following Table 1:

TABLE 1

| Test No. | Composition (parts) | | | Initial BLR, Percent | Mill Stability—Minutes at 170° C. to— | | | | Florida, Exposure—Sun-hours to Failure |
|---|---|---|---|---|---|---|---|---|---|
| | Resin | Dioctyl Phthalate | Epoxy Compound | | 80% BLR | 75% BLR | 60% BLR | 40% BLR | |
| 1 | 100 | 52.5 | 1.5 | 82 | 1 | 4 | 13 | 30 | 500 |
| 2 | 100 | 51 | 3 | 82 | 1 | 4 | 14 | 34 | 500 |
| 3 | 100 | 46.3 | 7.7 | 81 | 1 | 4 | 15 | 37 | 500 |
| 4 | 100 | 38.6 | 15.4 | 79 | | | 3 | 14 | 29 | >500 |
| 5 | 100 | | 54 | | | | | 3 | 15 | >500 |
| 6 | 100 | 54 | | 72 | | | | 1 | 2 | <100 |

As may be observed, the employment of various amounts of epoxide conferred some improvement in heat stability of the resin compositions.

It may be also observed that the heat and light stabilizer of Example 1 is compatible with commercial type plasticizers such as dioctyl phthalate.

EXAMPLE 6

A recipe was prepared containing 100 parts of the resin described in Example 1, 0.5 percent by weight of dibutyl tin maleate as a stabilizer and amounts of the epoxidized linseed oil fatty acid diester of 3-cyclohexene-1,1-dimethanol having an oxirane oxygen content of 8.23 percent; as indicated in Table 2. The composition was fluxed on a heated differential two-roll mill. The surface temperature of the rolls was maintained at 158° C. After a period of five minutes the flux contents were removed from the mill and strips of the approximately 30 mil sheet were mounted on a stainless steel wire mesh screen which was then placed in a circulating oven maintained at a temperature of 158° C. The strips were removed from the oven at 30 minute intervals and discoloration, with respect to the original sheet, was noted. The discoloration was measured by means of a Photovolt Reflection Meter, Model 610, equipped with a Wratten C–5 blue filter. The physical properties of the plasticized resin composition were determined in accordance with the previously-described procedures.

TABLE 2

| | |
|---|---|
| Plasticizer, p.p.hr. | 52 |
| Plasticizer, percent | 34.0 |
| Tensile, p.s.i. (24.5° C.) | 2730 |
| Elongation, percent (24.5° C.) | 250 |
| Load at 100% elong., p.s.i. (24.5° C.) | 2400 |
| ASTM Instron stiffness modulus, p.s.i. (24.5° C.) | 5800 |
| $T_F$, °C. | 7 |
| $T_4$, °C. | 24 |
| Brittle temperature, °C. | 8 |
| Extraction: | |
|    Oil, K, 50° C. | 0.4 |
|    Water, percent in 24 hours at 70° C. | 1.4 |
| Durometer "A" hardness (24.5° C.) | 89 |
| SPI volatile loss, percent in 24 hours at 70° C. | 0.3 |
| Heat stability data: | |
|    Initial color, percent BLR | 72 |
|    Min. at 158° C. to 80% BLR | -- |
|    Min. at 158° C. to 75% BLR | -- |
|    Min. at 158° C. to 60% BLR | 17 |
|    Min. at 158° C. to 15% BLR | >480 |
| Sweat-out | None |

What is claimed is:

1. A vinyl chloride composition comprising a vinyl chloride resin containing epoxidized diesters of 3-cyclohexene-1,1-dimethanols characterized by the formula:

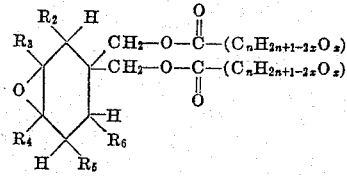

wherein $R_2$ through $R_6$ represent members selected from the group consisting of hydrogen atoms and lower alkyl groups and the group $(C_nH_{2n+1-2x}O_x)$ represents an epoxyalkyl group containing $n$ carbon atoms, $2n+1-2x$ hydrogen atoms and $x$ oxygen atoms wherein $n$ represents the integer 17 and $x$ represents a whole positive integer in the range of from 2 through 3.

2. A vinyl chloride composition comprising a vinyl chloride resin containing 3,4-epoxycyclohexane-1,1-dimethanol bis(9,10,12,13,15,16-triepoxystearate).

3. A vinyl chloride composition comprising a vinyl chloride resin containing 3,4-epoxycyclohexane-1,1-dimethanol bis(9,10,12,13-diepoxystearate).

4. A vinyl chloride composition comprising a vinyl chloride resin containing the epoxidized linseed oil fatty acid diesters of 3-cyclohexene-1,1-dimethanol.

References Cited in the file of this patent

UNITED STATES PATENTS 2,786,067   Frostick et al. _____ Mar. 19, 1957